United States Patent
Durand et al.

(10) Patent No.: US 9,258,595 B2
(45) Date of Patent: Feb. 9, 2016

(54) DEVICE FOR PROCESSING AND METHOD FOR TRANSMISSION OF ENCODED DATA FOR A FIRST DOMAIN IN A NETWORK PERTAINING TO A SECOND DOMAIN

(75) Inventors: Alain Durand, Rennes (FR); Christophe Laurent, Vignoc (FR); Sylvain Lelievre, Rennes (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 1722 days.

(21) Appl. No.: 10/504,897

(22) PCT Filed: Feb. 21, 2003

(86) PCT No.: PCT/FR03/00582
§ 371 (c)(1),
(2), (4) Date: Aug. 18, 2004

(87) PCT Pub. No.: WO03/073760
PCT Pub. Date: Sep. 4, 2003

(65) Prior Publication Data
US 2005/0084108 A1    Apr. 21, 2005

(30) Foreign Application Priority Data

Feb. 25, 2002 (FR) .................................. 02 022329

(51) Int. Cl.
*H04N 21/41* (2011.01)
*H04N 21/4367* (2011.01)
(Continued)

(52) U.S. Cl.
CPC ........... *H04N 21/4147* (2013.01); *H04N 7/163* (2013.01); *H04N 7/1675* (2013.01); *H04N 21/4122* (2013.01); *H04N 21/4367* (2013.01)

(58) Field of Classification Search
USPC ........................................................ 380/261
See application file for complete search history.

(56) References Cited

U.S. PATENT DOCUMENTS 6,081,601 A * 6/2000 Raivisto ..................... 380/270
6,178,242 B1   1/2001 Tsuria
(Continued)

FOREIGN PATENT DOCUMENTS

CN    1327662    12/2001
EP    0810754    12/1997
(Continued)

OTHER PUBLICATIONS

Search Report Dated Jul. 18, 2003.
(Continued)

*Primary Examiner* — Michael Chao
*Assistant Examiner* — Devin Almeida
(74) *Attorney, Agent, or Firm* — Joel M. Fogelson; Vincent E. Duffy

(57) ABSTRACT

The processing device is intended to be connected to a network of the second domain so as to receive data encrypted according to an encryption method specific to the first domain. It comprises:
 a memory for containing a first secret specific to the first domain;
 means of decryption of the data encrypted with the aid of the first secret so as to obtain decrypted data;
 means of encryption of the data decrypted according to an encryption method specific to the second domain, so that the data encrypted by said means of encryption cannot be decrypted other than with the aid of a second secret specific to the second domain.
The invention also relates to the method for transmitting data encrypted with the aid of the secret specific to the first domain in the network of the second domain.

18 Claims, 7 Drawing Sheets

(51) Int. Cl.
*H04N 7/167* (2011.01)
*H04N 21/4147* (2011.01)
*H04N 7/16* (2011.01)

(56) References Cited

U.S. PATENT DOCUMENTS

| | | | |
|---|---|---|---|
| 6,594,758 B1* | 7/2003 | Okui | 713/163 |
| 6,668,324 B1* | 12/2003 | Mangold et al. | 713/189 |
| 6,862,583 B1* | 3/2005 | Mazzagatte et al. | 705/64 |
| 2003/0005285 A1* | 1/2003 | Graunke | 713/153 |
| 2003/0105720 A1 | 6/2003 | Ishibashi | |
| 2003/0147536 A1* | 8/2003 | Andivahis et al. | 380/277 |

FOREIGN PATENT DOCUMENTS

| | | |
|---|---|---|
| EP | 0858184 | 8/1998 |
| JP | 2000101984 | 4/2000 |
| JP | 2001119357 | 4/2001 |
| JP | 2001256413 | 9/2001 |
| WO | WO 00/56068 | 9/2000 |
| WO | WO 00/62505 | 10/2000 |
| WO | WO0074297 | 12/2000 |
| WO | WO0155850 | 8/2001 |

OTHER PUBLICATIONS

International Standard ISO/IEC 13818-1—Information technology—Generic coding of moving pictures and associated audio information: Systems—Dec. 1, 2000—Patent Counsel Feb. 25, 2002, 174pages.

IEEE Standard for a High-Performance Serial Bus__1995, pages392. Thomson_SmartRight 0.85—Modifications from version 0.842 to 0.85.

* cited by examiner

DEVICE FOR PROCESSING AND METHOD FOR TRANSMISSION OF ENCODED DATA FOR A FIRST DOMAIN IN A NETWORK PERTAINING TO A SECOND DOMAIN

This application claims the benefit, under 35 U.S.C. §365 of International Application PCT/FR03/00582, filed Feb. 21, 2003, which was published in accordance with PCT Article 21(2) on Sep. 4, 2003 in French and which claims the benefit of French patent application No. 0202329, filed Feb. 25, 2002.

FIELD OF THE INVENTION

The present invention relates to the field of protection against copying digital data and against illegal access to such data, in particular when the data is circulating in local digital networks such as digital domestic networks.

STATE OF THE ART

In the context of protection against illicit copying of digital data, systems are known in which a digital content may be copied for use in a determined domain. Domain is intended to mean a set of installations belonging for example to one and the same domestic network, these installations sharing a secret specific to the domain, for example a cryptographic encryption key. An installation belonging to a domain may be a portable installation. Its membership of a particular domain will be determined by its knowledge of the secret specific to that particular domain.

The digital contents of such a domain may be of three sorts:
  "free copy": this type of content may be recorded and played back in any domain, so it is not necessary to know a secret specific to a domain to read this type of content;
  "private copy": this type of content can be copied only for a particular domain in which it can be played back; the content is recorded in a form that requires the knowledge of the secret of the particular domain to be able to be played back. This type of content cannot be read on an installation that does not belong to the particular domain;
  "read only": this type of content may only be read in a particular domain but it cannot be copied; or, if copies of the content are made, they cannot be played back thereafter.

A digital content usually enters a domain through an access device or a source device. This type of device retrieves digital data through a channel external to the domain and broadcasts them to the other devices of the domain, for example by using a digital bus connecting the different installations of the domain. A source device may in particular be a digital decoder intended to receive video programmes from outside a digital domestic network via a satellite antenna or a cable connection, in order to broadcast them in the network. It may also be an optical disk drive broadcasting in a domestic network (audio and/or video) data read on an optical disk (the disk in this case contains data originating from outside the network).

Inside the domain, the digital content may be recorded by digital recording devices such as a DVD ("Digital Versatile Disc") recorder or a hard disk.

Finally, the content is presented to the users of the domain by presentation devices. These devices are suitable for receiving the content of the domain (particularly the digital data circulating in a digital domestic network) in order to process it (particularly in order to decrypt it if necessary) and present it to the end user. This particularly involves television receivers used to view video data or hi-fi installations to listen to audio data.

A source device usually contains a module known as a "conditional access" module or a digital rights management module ("DRM") depending on whether the content is respectively a "broadcast content" or a "broadband content". These modules manage the protection of the content put in place by the content provider.

For example, considering pay television programmes, the content provider, that is to say the programme broadcaster, usually provides the digital programmes in scrambled form (that is to say encrypted) using keys called control words, the control words themselves being transmitted with the data in encrypted form in messages called "ECM" ("Entitlement Control Message"). The content provider also provides the subscribers who have paid to receive the programmes with the key with which to decrypt the control words and with a conditional access module containing, amongst other things, the algorithm for decrypting the control words (the key and the conditional access module are preferably included in a smart card). It is also the content provider who defines the rules of use of the content provided, that is to say who defines whether the content is of the "free copy", "private copy" or "read only" type.

In the system of protection against copying known by the name of SmartRight™ (SmartRight is a registered trademark of THOMSON multimedia), the source devices convert the received contents according to the rules of use of those contents.

When a content received by a source device of a given domain is of the "private copy" type, the content is converted in such a way that it can be decrypted only by presentation devices belonging to that particular domain (and therefore all sharing one and the same secret). The French patent application No. 01 05568, filed on Apr. 25, 2001 in the name of the applicant THOMSON Licensing S.A., concerning a symmetric key management method in a communication network, describes in particular how this conversion is carried out so that only the presentation devices knowing a secret key of the communication network are capable of decrypting the content to read it.

It will be noted that, in the rest of the description, the terms "secret key" or "symmetric key" will be used to designate a cryptographic key used in a symmetric encryption or decryption algorithm, such as the algorithm known by the name of AES (acronym for "Advanced Encryption Standard") or by the name of "Rijndael" and described in particular in the document entitled *"Proceedings from the first Advanced Encryption Standard Candidate Conference, National Institute of Standards and Technology (NIST), August* 1998, *J. Daemen and V. Rijmen"*.

When a content received by a source device is of the "read only" type, the content is also converted by this source device by using the method described in the abovementioned patent application such that it can be read only by the presentation devices of the network which know the network secret key. In addition, a method described in French patent application No. 00 15894, filed on Dec. 7, 2000 in the name of THOMSON multimedia, is implemented so that the content cannot be copied in the domain or, if copied, it cannot be played back by the presentation devices of the domain.

When a content received in a domain is of the "free copy" type, it is usually in clear and is left in that form by the source device which has received the content to broadcast it in the domain.

Thanks to this system, it is possible for a user, who receives a content after having paid the provider of that content the relevant fees, to keep a private copy of that content for his later personal use. This copy may be read only by the presentation devices of his domain, that is to say of the domain in which the content was initially received.

Nevertheless, there are situations in which it is desirable to be able to play back a private copy made in a first domain on a presentation device of a second domain. In particular, if a user wants to view on the domain of a friend the copy of a film made on his own domain, naturally without a copy being able to be made for the domain of the friend.

This may also be necessary in the event of union or of separation of users. In the case of union, if each user previously had his own domain, the two domains cannot be linked together because the installations of the two domains do not share the same secret. In this case, if the two users do not wish to manage two different domains, the contents recorded previously on a first domain will have to be able to be played back on the second domain. Likewise, when there is a need to separate one domain into two different domains (because spouses are separating or a child leaves the home of its parents), the contents previously recorded on the common domain need to be able to be played back on the two new domains.

The present invention aims to resolve the abovementioned problems.

DESCRIPTION OF THE INVENTION

The invention relates, according to a first aspect, to a data processing device intended to be connected to a network belonging to a second domain so as to receive data encrypted according to an encryption method specific to a first domain. The device comprises:
 a memory for containing a first secret specific to the first domain;
 means of decryption of the data encrypted with the aid of said first secret so as to obtain decrypted data;
 means of encryption of the data decrypted according to an encryption method specific to the second domain, so that the data encrypted by said means of encryption cannot be decrypted other than with the aid of a second secret specific to the second domain.

According to a particular characteristic of the invention, furthermore comprises:
 a memory for containing a first symmetric key as well as the encryption of the first symmetric key with the aid of the second secret specific to said second domain; the aforementioned means of encryption performing an encryption of the data decrypted with the aid of the first symmetric key; and
 means of broadcasting on the network the data encrypted by the means of encryption and the encryption of the first symmetric key with the aid of the second secret specific to the second domain.

Thus, the processing device of the invention contains only the secret specific to the first domain. It does not need to know the secret specific to the second domain in order to encrypt the data for the second domain; it encrypts the data with the aid of a symmetric key and attaches the encryption of the first symmetric key with the aid of the secret specific to the second domain to these encrypted data. The data may thus be decrypted in the second domain.

According to another particular characteristic of the invention, the first secret specific to the first domain and the second secret specific to the second domain are respectively symmetric keys.

According to a particular embodiment of the invention, the processing device furthermore comprises means for generating an ephemeral masking key; means for masking the data decrypted with the aid of the masking key so as to form masked data, said masked data being encrypted by the means of encryption with the aid of the first symmetric key; and means for responding to an operation of authentication by a presentation device connected to the network which has previously received the data broadcast by the means of broadcasting, the response to the authentication operation comprising the ephemeral masking key.

According to a variant of the aforesaid embodiment of the invention, the processing device furthermore comprises means for generating an ephemeral authentication key, said ephemeral authentication key being encrypted, with the masked data, by the means of encryption with the aid of the first symmetric key; and the means of response to the authentication operation calculating the response as a function of the authentication key and of a random number received from said presentation device.

According to other characteristics of the invention, the data received by the processing device contain copy control information of the "private copy authorized" or "single copy only authorized" type; the device comprises means for replacing said copy control information with other copy control information of the "read only" type; and the data broadcast by the device contain said copy control information of the "read only" type.

Thus, the data broadcast in the network of the second domain cannot be copied in the second domain.

The invention also relates, according to a second aspect, to a method of transmitting data, encrypted according to a method of encryption using a first secret specific to a first domain, in a network belonging to a second domain. The method comprises the steps consisting, for a first broadcasting device connected to the network, in:
 (a) performing a first broadcast of the data encrypted in the network to aforementioned data processing device; and consisting, for said processing device, in:
 (b) decrypting said data encrypted with the aid of the first secret contained in the processing device so as to obtain decrypted data;
 (c) encrypting the data decrypted with the aid of a first symmetric key contained in the processing device; and
 (d) performing a second broadcast in the network of the data encrypted in step (c) with the aid of the first symmetric key and of the encryption of the first symmetric key with the aid of a second secret specific to the second domain, said encryption having been transmitted previously to the processing device by a device of the second domain.

According to a particular characteristic of the invention, step (c) comprises the substeps consisting, for the processing device, in generating and storing an ephemeral masking key; in masking the data decrypted with the aid of the masking key so as to form masked data; and in encrypting the data masked with the aid of the first symmetric key.

According to another characteristic of the invention, step (c) furthermore comprises the substeps consisting, for the processing device, in generating and storing an ephemeral authentication key; and in encrypting said ephemeral authentication key and the data masked with the aid of the first symmetric key; and the method furthermore comprises, after step (d), a step consisting in responding to an operation of authentication by a presentation device connected to the network which has previously received the data broadcast in step (d), the response to the authentication operation comprising said ephemeral masking key.

According to another particular characteristic of the invention, the response to the authentication operation is calculated as a function of the authentication key and of a random number received from the presentation device.

According to yet another characteristic of the invention, the encrypted data transmitted during the first broadcast contain copy control information of the "private copy authorized" or "single copy only authorized" type; and the method furthermore comprises, before step (d), a step consisting in replacing said copy control information with other copy control information of the "read only" type.

According to a particular aspect of the invention, the method furthermore comprises a phase of initializing the processing device consisting in connecting the processing device to the network belonging to the first domain and in receiving in said processing device the secret specific to the first domain, said secret being transmitted by another device connected to the network of the first domain.

According to another particular aspect of the invention, the initializing phase furthermore comprises the steps consisting in connecting the processing device to the network belonging to the second domain; and consisting, for the processing device, in generating the first symmetric key; in transmitting the first symmetric key in a secure manner to at least one device of the second domain; and in receiving from a device of the second domain the encryption of said first symmetric key with the aid of the second secret specific to the second domain.

BRIEF DESCRIPTION OF THE DRAWINGS

Other characteristics and advantages of the invention will appear through the description of particular nonlimiting embodiments explained with the aid of the attached figures, in which.

DETAILED DESCRIPTION OF EMBODIMENTS OF THE INVENTION

Figure 1:
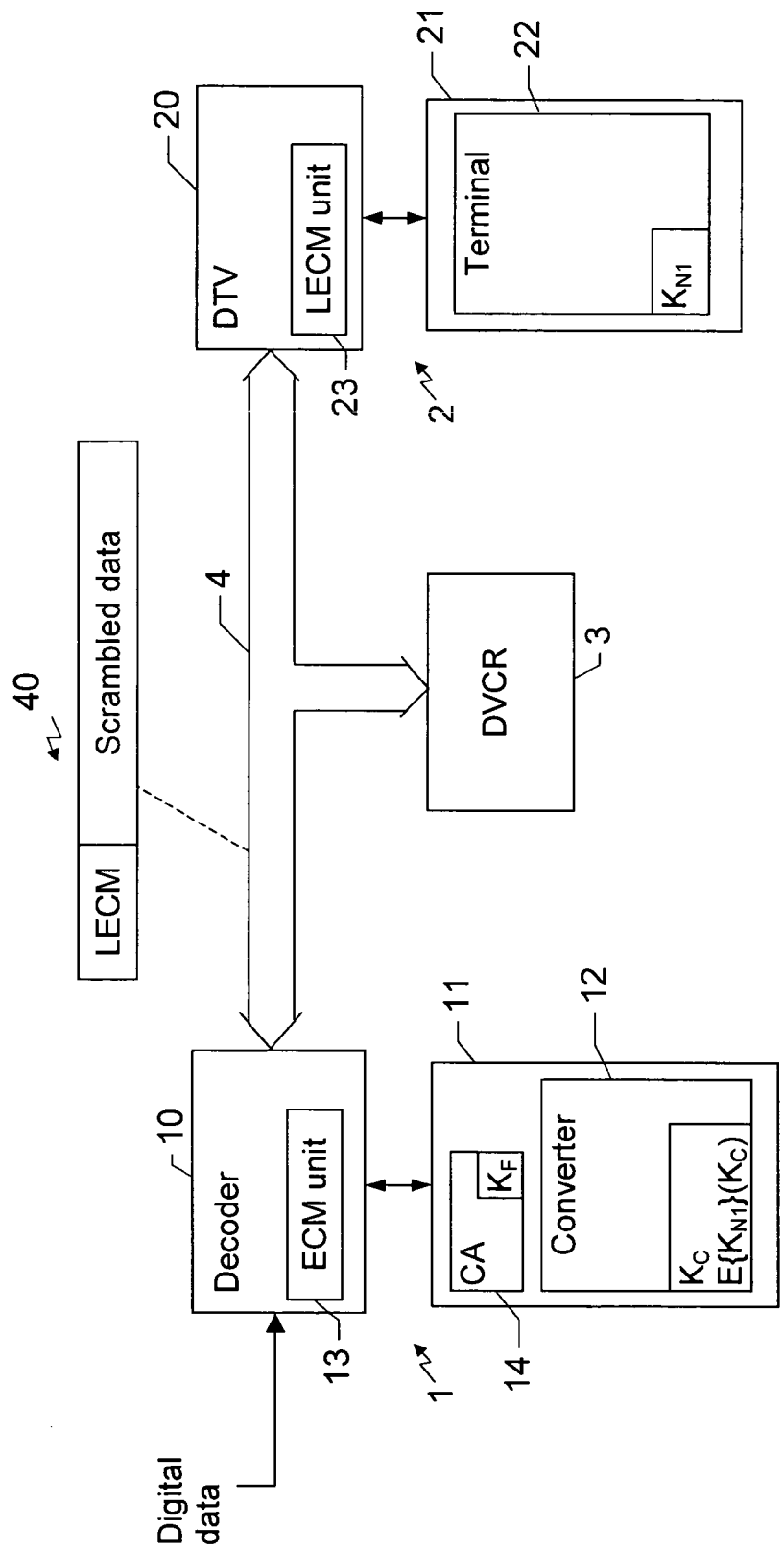
FIG. 1 is a block diagram of a digital domestic network interconnecting devices belonging to a first domain.

Initially, in relation to FIG. 1, an example of domestic network will be described in which a system of protection against copying is implemented so that private copies of the digital contents can be made for future use only in the domestic network in which they have been copied.

The network comprises a source device 1, a presentation device 2 and a recording device 3 interconnected by a digital bus 4, which is for example a bus according to the standard IEEE 1394.

The source device 1 comprises a digital decoder 10 furnished with a smart card reader fitted with a smart card 11. This decoder receives digital data, particularly audio/video programmes distributed by a service provider.

The presentation device 2 comprises a digital television receiver (DTV) 20 furnished with a smart card reader fitted with a smart card 21 and the recording device 3 is in particular a digital video cassette recorder (DVCR).

The digital data that enter the network via the source device 1 are usually data scrambled by a content provider, for example according to the pay television principle. In this case, the data are scrambled with the aid of control words (CW) which are themselves transmitted in the data stream in a form encrypted with the aid of an encryption key $K_F$ while being contained in entitlement control messages (ECM). The encryption key $K_F$ is provided to users who have paid to receive the data, in particular being stored in a smart card. In the example in FIG. 1, the smart card 11 contains such a key $K_F$ and a conditional access CA module 14 capable of decrypting the control words CW.

The source device 1 which receives these scrambled digital data formats them so that they are broadcast over the digital network in a protection format specific to the domestic network. The decoder 10 comprises an "ECM unit" module 13 which extracts from the received data stream the ECM messages containing the control words encrypted with the aid of the key $K_F$ in order to transmit them to the CA module 14. The latter decrypts the control words CW and transmits them to a converter module 12 also contained in the smart card 11.

The role of the converter module 12 is to convert the information contained in the ECM messages into LECM ("Local Entitlement Control Message") messages protected with the aid of a secret key specific to the local domestic network, which will be called the key $K_{N1}$.

It is assumed that the converter module has previously randomly generated a symmetric key $K_C$ and has requested the encryption of that key $K_C$ with the aid of the network secret key $K_{N1}$. The converter module therefore has in memory the key $K_C$ and the key $K_C$ encrypted by the network secret key $K_{N1}$ $E\{K_{N1}\}(K_C)$.

In the rest of the description, the notation $E\{K\}(M)$ will always be used to signify encryption with a key K of the data M.

The abovementioned French patent application No. 01 05568 describes in detail the method which allows the converter module to obtain the encryption of the key $K_C$ with the aid of the network secret key $K_{N1}$, this encryption being carried out in a presentation device. Specifically, the presentation devices of the network, such as 2 in FIG. 1, are the only ones to have the network secret key $K_{N1}$. The latter is contained in the smart card 21 with a terminal module 22 responsible, amongst other things, for the operations of encryption and decryption with the network key $K_{N1}$.

The system operates as follows. When the digital data are received in the decoder 10, the "ECM unit" module 13 extracts the ECM messages containing the control words CW encrypted with the aid of the key $K_F$ specific to the content provider and provides them to the CA module 14. The latter decrypts the control words CW and transmits them to the converter module 12. In addition, the ECM message may also contain information concerning control of the copying of the transmitted content indicating whether the content may or may not be freely copied in the network or whether the content may only be viewed (or listened to, etc.) in the network. This information is also transmitted to the converter module.

The converter module then constructs an LECM message based on these data. This message preferentially comprises:

a portion A in clear containing in particular the information concerning control of the copying of the content, that is to say indicating whether the content is of the "free copy", "private copy" or else "read only" type; this information is often denoted VCI ("Viewing Control Information"). The portion in clear also contains the key $K_C$ encrypted with the network key: $E\{K_{N1}\}(K_C)$.

a portion B, encrypted with the key $K_C$, and containing essentially the decrypted control word CW; this portion can be summarized as: $E\{K_C\}(CW)$.

an integrity field formed by the result of a hash function applied to all the portions A and B before encryption of the portion B. This integrity field is advantageously used to verify the validity of the LECM messages and to ensure that they are not illicitly modified.

The LECM message is then transmitted to the ECM unit which inserts it into the data stream in the place of the ECM messages. It should be noted that, when the received content is not already in scrambled form as described above and does not contain any ECM message, the converter module 12 is responsible in this case for putting the data in this form so that the data stream broadcast over the network 4 is always in data packet form like the packet 40 represented in FIG. 1 containing an LECM message and scrambled data.

The content of this packet can be summarized as follows:
LECM|E{CW}(<data>); or:
$E\{K_{N1}\}(K_C)$|VCI|$E\{K_C\}(CW)$|Integrity field|E{CW}(<data>);
where "|" represents the concatenation operator.

When these data packets are received by the digital television receiver 20, they are transmitted to the "LECM unit" module 23 which extracts therefrom the LECM messages in order to transmit them to the terminal module 22. The latter first decrypts $E\{K_{N1}\}(K_C)$ with the aid of the key $K_{N1}$ to obtain the key $K_C$. Then, with the aid of the key $K_C$, it decrypts $E\{K_C\}(CW)$ to obtain the control word CW which it transmits to the "LECM unit" module 23. The latter is then able to descramble the data E{CW}(<data>) with the aid of the control word. The unscrambled data are then presented to the user. In the case of video data, the data may be viewed on the television receiver 20.

If the data stream containing the packets 40 is recorded by the digital video cassette recorder 3 to be played back later, it is noted that this is not possible unless the presentation device on which the data are to be presented contains the secret key $K_{N1}$ of the domain in which the data were recorded. In what follows, this domain will be called N1.

Remember that, in the example in FIG. 1, the domain is understood to be the digital domestic network and all the installations connected to it and also portable presentation installations (not shown) which are likely to be connected to the domestic network and which belong to the members of the family owning the domestic network. The portable presentation installations (for example compressed music file readers) are considered to form part of the domain N1 when they contain the secret key $K_{N1}$. Refer to the abovementioned French patent application No. 01 05568 for a description of how the secret key of the domain N1 is transmitted to the new presentation devices which "enter" the domain (for example when a member of the family buys a new installation).

Now suppose that a user, having recorded a content (for example a film) of the "private copy" type on his domain N1, wants to be able to view it on a television receiver belonging to another domain which will be called N2.

In this case, the user inserts for example a cassette containing the film into a digital video cassette recorder of the domain N2. This video cassette recorder will broadcast the film over the domestic network of the domain N2 so that it is viewed on a television receiver of the domain N2. But since the latter does not know the secret key of the domain N1, $K_{N1}$, it will not be able to decrypt the content of the LECM messages and therefore will not be able to descramble the data to present the film to the user.

According to the principle of the invention, in order to be able to view in the domain N2 the content recorded as "private copy" in the domain N1, the content will be converted into content of "read only" type for domain N2.

Hereinbelow we shall describe several embodiments enabling this conversion to be carried out.

We shall firstly describe the general principle which will be used in the various embodiments.

To do this, we need a device that we shall call M to carry out the conversion. This device must contain the secret of the domain N1, namely the key $K_{N1}$, and must be installed on the domain N2 before being able to do the conversion. M must comprise a terminal module equivalent to a terminal module of a presentation device of the domain N2 and a converter module equivalent to a converter module of a source device of the domain N2 so as to be able to convert the content for the domain N2.

This device M, once linked to the domestic network of the domain N2, must first generate a symmetric key $K'_C$ and have it encrypted with the aid of the secret key of the domain N2, $K_{N2}$, to obtain $E\{K_{N2}\}(K'_C)$. Next, when it receives the content broadcast by the digital video cassette recorder of the domain N2, it replaces the messages LECM1 containing:
$E\{K_{N1}\}(K_C)$|VCI|$E\{K_C\}(CW)$| integrity field, with VCI containing the code "private copy" code, with the messages LECM2 containing:
$E\{K_{N2}\}(K'_C)$|VCI|$E\{K'_C\}(CW)$| integrity field, with VCI containing the "read only" code and it rebroadcasts this content which can thus be decrypted by a television receiver of domain N2 containing the secret key $K_{N2}$.

Figure 2:
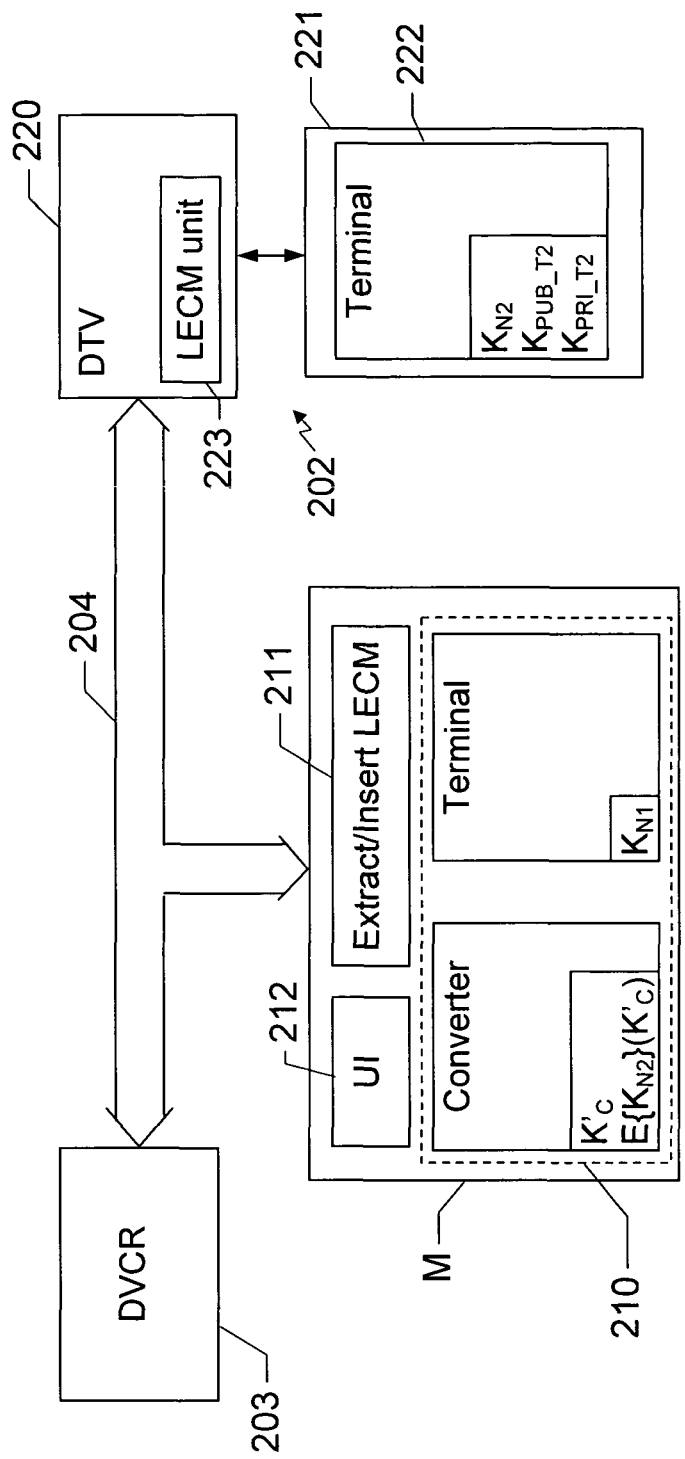
FIG. 2 is a block diagram of a domestic network comprising devices belonging to a second domain illustrating the first embodiment of the invention.

In FIG. 2 we have diagrammatically represented the digital domestic network of a domain N2 in which a first embodiment of the invention is implemented. We have represented only the elements necessary for the comprehension of the invention.

In this network, a digital bus 204 interconnects a digital video cassette recorder 203, a presentation device 202 and a device M originating from a domain N1. The digital bus 204 is preferentially a bus according to the standard IEEE 1394. The presentation device 202 comprises a digital television receiver DTV 220 which comprises an "LECM unit" module 223 and a smart card 221 comprising a terminal module 222. In the smart card 221 is stored the secret key of the domain N2: $K_{N2}$.

The device M is for example a portable installation containing a terminal/converter module 210 which may either be a module built into a secure processor of the installation M, or a removable module, contained in a smart card, itself inserted into the installation M. The terminal/converter module 210 implements the functionalities of the converter and terminal modules such as they were described in conjunction with FIG. 1. The device M also contains a "extract/insert LECM" module 211 whose manner of operation will be explained hereinbelow.

The device M also comprises a user interface UI 212 which enables the user to configure it as presentation device or as source device according to the domain in which it is located.

To begin with, the device M must be initialized in the domain N1 to receive the secret key $K_{N1}$. It is therefore assumed that, before being connected to the network of domain N2, the device M has previously been connected to the network of domain N1 in the guise of a "virgin" portable presentation device, that is to say one that does not belong to any domain. The device M has next received from the "originator" device of domain N1 the secret key $K_{N1}$ before becoming "sterile".

The terms "virgin", "originator" and "sterile" are defined in the aforementioned French patent application No. 01 05568 and designate respectively a presentation device (or more precisely its terminal module):

which is not connected to any domain and contains no domain secret key ("virgin" device);

which has the secret key of a domain and can transmit it to a new virgin presentation device likely to be connected to the domain ("originator" device); and which has the secret key of a domain but cannot transmit it to another device ("sterile" device).

The aforementioned patent application also describes the mechanisms for secure transmission of the secret key between the different devices.

The device M can then be connected to a domain N2 in which one wishes to view a content recorded as "private copy" in domain N1. It is in this case connected to the network of domain N2 as source device.

Figure 3:
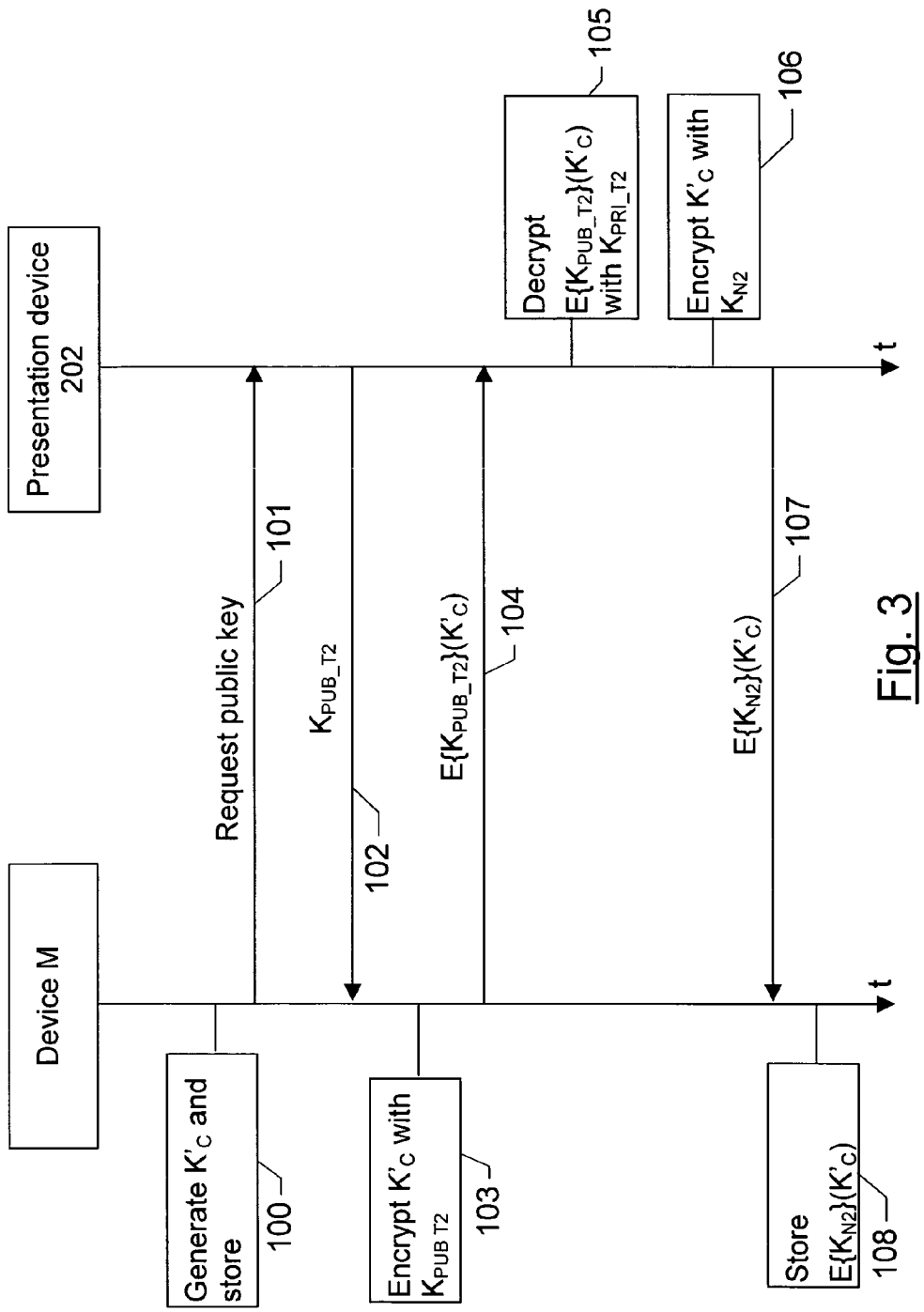
FIG. 3 is a time chart illustrating exchanges of keys between two devices of the domestic network of FIG. 2 according to the first embodiment of the invention.

FIG. 3 illustrates the steps which are implemented after the device M has been connected to the network of domain N2.

During a first step 100, a symmetric key $K'_C$ is generated randomly by the converter module of the device M and is stored by the device. In what follows, we shall sometimes speak of the converter module and sometimes of the terminal module of the device M depending on whether the terminal/converter module 210 implements functionalities customarily implemented by a converter module or by a terminal module.

During the next step 101, the device M broadcasts a request message over the network of the domain N2 to receive a public key of a presentation device of the network. Each presentation device has in effect a pair of asymmetric keys stored in the smart card which contains the terminal module. For example, the presentation device 202 in FIG. 2 has a public key $K_{PUB\_T2}$ and a private key $K_{PRI\_T2}$. These keys are used in a manner known per se to carry out encryption or decryption operations with the aid of asymmetric cryptographic algorithms (for example the RSA algorithm, from the name of its creators Rivest, Shamir and Adleman).

Any presentation device of the domain N2 may respond to this request 101. It is assumed in what follows that the presentation device 202 responds to the request by sending its public key $K_{PUB\_T2}$ to the device M in step 102.

The converter module of the device M then carries out the encryption of the symmetric key $K'_C$ with the aid of the public key $K_{PUB\_T2}$ received (step 103), then it sends the result of this encryption $E\{K_{PUB\_T2}\}(K'_C)$ to the presentation device 202 (step 104). The latter decrypts the received result with the aid of its private key $K_{PRI\_T2}$ to obtain $K'_C$ (step 105). It then proceeds (step 106) with the encryption of $K'_C$ with the secret key of the domain N2, $K_{N2}$, to obtain $E\{K_{N2}\}(K'_C)$, which is the result that it sends to the device M in step 107. The device M stores this result $E\{K_{N2}\}(K'_C)$ in the next step 108.

The device M is now ready to receive a content of "private copy" type from the domain N1 so as to convert it into content of "read only" type for the domain N2.

We shall now describe, in conjunction with FIG. 4, the manner in which this conversion is performed.

Figure 4A:
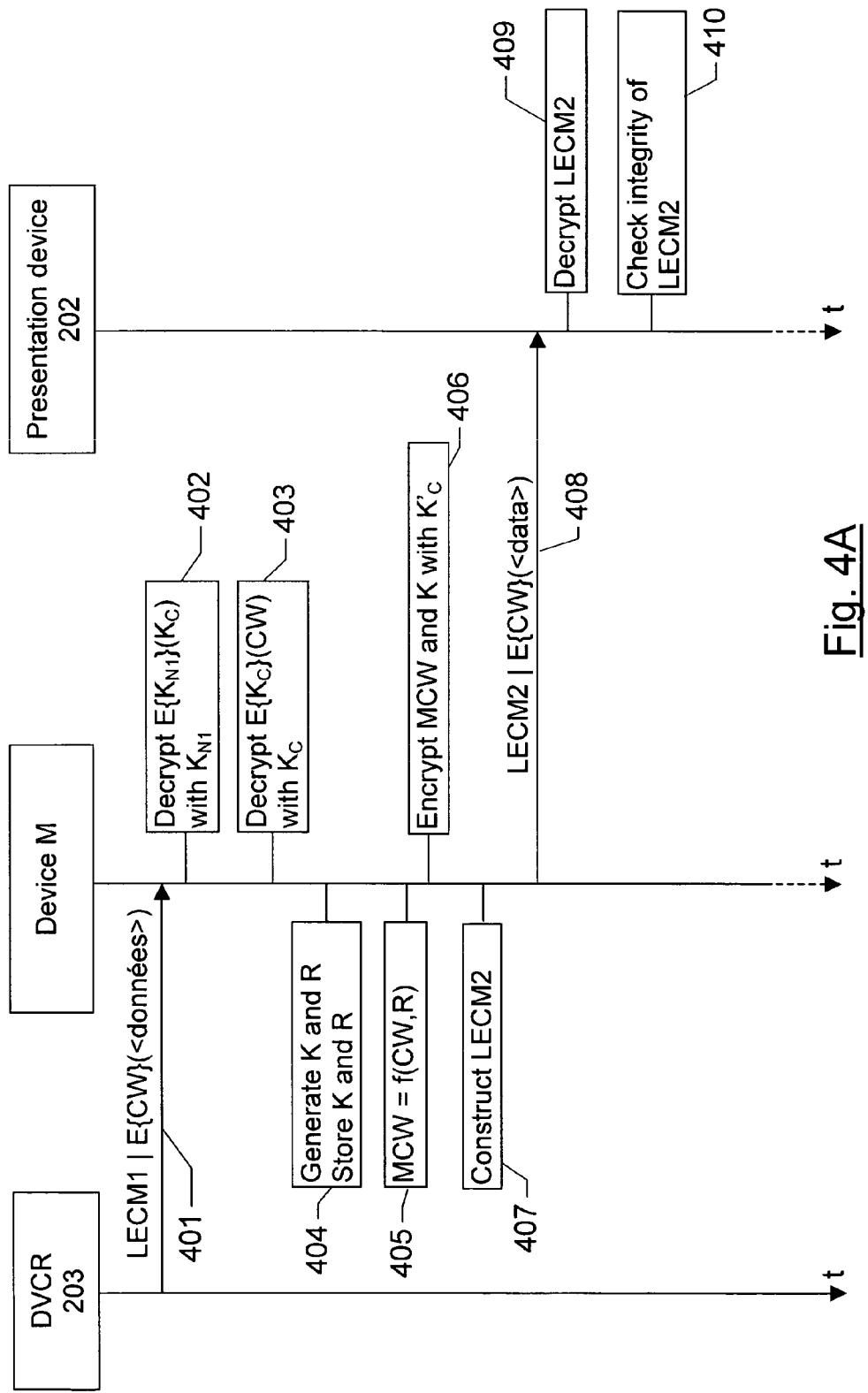
FIGS. 4A and 4B are time charts illustrating the exchanges of data between devices of the domestic network of FIG. 2 that can be used to read (without copying it) in the second domain, a content recorded in the first domain.
Figure 4B:
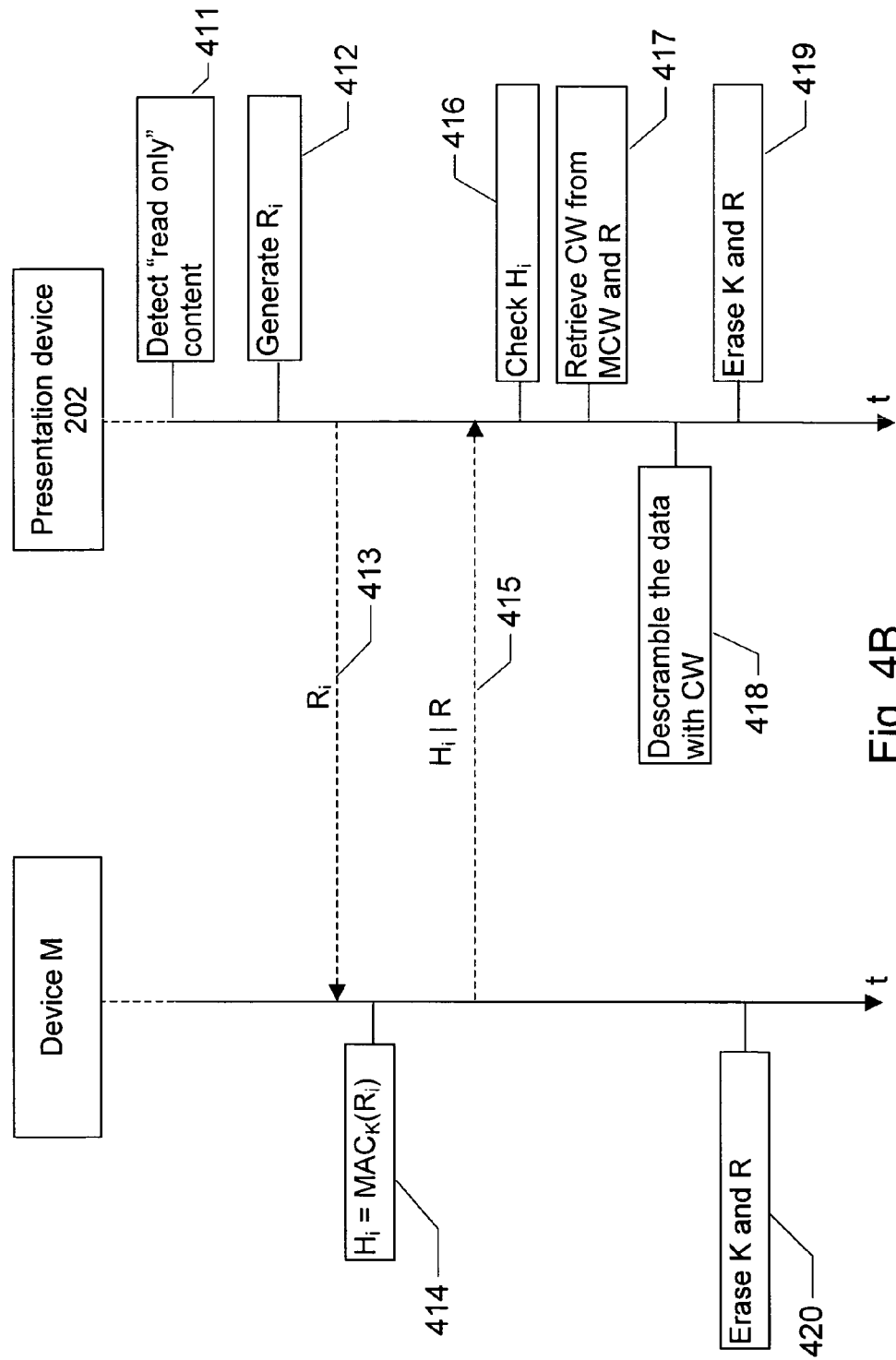

FIG. 4 (divided into two FIGS. 4A and 4B in the appended drawings) uses three downward vertical axes t to represent the time axis to illustrate the processing performed by the digital video cassette recorder DVCR 203, the device M and the presentation device 202 as well as the exchanges between these devices when a new content originating from the domain N1 is broadcast on the digital domestic network of domain N2.

Initially, the user inserts for example the video cassette containing the video programme recorded in domain N1, into the digital video cassette recorder 203 of domain N2. The video cassette recorder then broadcasts on the network of domain N2 the data recorded on the cassette destined for the device M. This broadcast is performed by using a particular channel of the network, which is either predefined or chosen by the user. The device M is set to the same channel to receive the broadcast data.

These data broadcast in step 401 of FIG. 4 contain data packets such as the following packet:

LECM1|E{CW}(<data>), i.e.

$E\{K_{N1}\}(K_C)$|CP|E{$K_C$}(CW)|integrity field|E{CW} (<data>), with "CP" corresponding to the "private copy" code of the "VCI" information.

When these data packets are received in the device M, the "Extract/insert LECM" module 211 extracts the messages LECM1 from the data packets and transmits them to the terminal module of the device M. The latter firstly performs the decryption of $E\{K_{N1}\}(K_C)$ with the key $K_{N1}$ to obtain the key $K_C$ in step 402. It then performs the decryption of $E\{K_C\}$(CW) with the key $K_C$ obtained in the previous step to obtain the control word CW in step 403 and the control word is transmitted to the converter module.

Next, the content must be converted into content of "read only" type for domain N2 by the converter module of the device M. The following steps are therefore performed by the converter module of M:

In step 404, it generates two random numbers R and K. These numbers are preferentially generated by a pseudo-random number generator well known per se. The number R will be used as ephemeral masking key for the control words and will be called the "masking key" subsequently in the description. The number K itself constitutes an ephemeral authentication key that for greater convenience will be called the "authentication key" subsequently in the description.

The masking key R and the authentication key K are generated when the first data packet of the broadcast content is received in the device M. They are also stored temporarily in step 404 in a secure memory area of the device M which will erase them, as will be seen hereinbelow, once the content has been transmitted in full to a presentation device of domain N2. Step 404 is therefore not implemented on each receipt of a message LECM1 in the converter module. The subsequent steps on the other hand are implemented for each new message LECM1 received.

In step 405, the converter module of the device M calculates a masked control word MCW as a function of the plaintext control word obtained in step 403 and of the masking key R. Preferably, the following operation is performed:

MCW=CW⊕R; where ⊕ represents the "exclusive OR" operation ("XOR").

Next, in step 406, the converter module encrypts the masked control word MCW and the authentication key K with the aid of the symmetric key $K'_C$ then, in step 407, it constructs the message LECM2 which contains:

$E\{K_{N2}\}(K'_C)$|LS|$E\{K'_C\}$(MCW|K)| integrity field, with "LS" corresponding to the "read only" code for the "VCI" information and where the integrity field is calculated as follows:

Hash ($E\{K_{N2}\}(K'_C)$|LS|MCW|K), where "Hash (x)" represents a hash function, that is to say a mathematical function which converts an input data set "x"

into a data set "y" of fixed size, often smaller than the input data size, and representative of the input data; this function is also a one way function, that is to say that, knowing "y", it is impossible to find "x" again, such as y=Hash(x). Preferentially, the SHA-1 function described in document "*Secure Hash Standard, FIPS PUB* 180-1*, National Institute of Standard Technology,* 1995" is used.

Once the message LECM2 has been constructed by the converter module of the device M, it is transmitted to the "Extract/Insert LECM" module 211 which inserts it into the data packet in place of the initial message LECM1.

In step 408, the data packet modified with the message LECM2 is sent over the bus 204 of the network of domain N2 using the customary broadcasting channel of the digital video cassette recorder 203. Thus, the presentation devices of domain N2 may have access to the content as if it had been broadcast directly by the digital video cassette recorder 203.

It will be noted that the broadcasting channel used is one of the isochronous channels of the IEEE 1394 bus, which channel customarily transports the data compressed according to the MPEG 2 standard (ISO/IEC 13818-1).

Let us assume that the user wants to view the content on the presentation device 202 of the domain N2, that is to say on the television receiver 220. The data packets sent in step 408 are therefore received by the digital television receiver 220 and the "LECM unit" module 223 extracts the messages LECM2 so as to transmit them to the terminal module 222 for processing.

In FIG. 2 we have represented just a single presentation device in domain N2 but it is entirely possible for there to be several of them. In this case, it is not necessarily the same presentation device which performs the encryption of the symmetric key $K'_C$ with the secret key of the network $K_{N2}$, as represented in FIG. 3, and which receives the data packets broadcast by the device M as represented in FIG. 4.

The subsequent steps are implemented in the terminal module 222 of the presentation device 202.

To begin with, in step 409, the terminal module decrypts the content of the message LECM2. Firstly, it decrypts $E\{K_{N2}\}(K'_C)$ with the key $K_{N2}$ to obtain the key $K'_C$ with which it decrypts $E\{K'_C\}(MCW|K)$ to obtain MCW|K.

Next, in step 410, a check of the integrity of the message LECM2 is performed by calculating:

Hash $(E\{K_{N2}\}(K'_C)|LS|MCW|K)$ on the basis of the hereinabove decrypted data and by comparing this result with the integrity field of the message LECM2.

If the two are identical, then the message LECM2 is considered to be valid and the method continues; otherwise the method is stopped. In the latter case provision may be made to display a warning message destined for the user.

When the message LECM2 is valid, the terminal module next detects in step 411, by reading the VCI field="LS", that this is a content of "read only" type.

In the next step 412, with the aim of authenticating the device M which has sent the data packet over the network, the terminal module 222 generates a random number $R_i$ and then the presentation device 202 sends it to the device M (step 413) using the asynchronous channel of the bus 204 through which the command messages customarily travel (the sending by the asynchronous channel of the bus 204 is represented by a dashed arrow in FIG. 4).

In step 414, when the device M receives the number $R_i$, it performs the following calculation (performed by the converter module):

$$H_i=MAC_K(R_i),$$

where "$MAC_K(x)$" represents a "Message Authentication Code" of the message x using a key K. For further details regarding "MACs", reference may be made to the work "*Handbook of applied cryptography, Alfred J. Menezes, Paul C. van Oorschot, Scott A. Vanstone,* 1997, page 325".

The HMAC-SHA-1 function, described in particular in the publication "Keyed-Hashing for Message Authentication, RFC 2104, Krawczyk, Bellare and Canneti, 1997" available at the following internet address http://www.ietf.org/rfc/rfc2104.txt, will preferably be used to calculate $H_i$.

In the next step 415, the device M sends, through the asynchronous channel of the bus 204, the result of the calculation $H_i=MAC_K(R_i)$ as well as the masking key R to the presentation device 202.

The terminal module 222 then checks, in step 416, the validity of the number $H_i$ received by performing the following calculation:

$H'_i=MAC_K(R_i)$ using the number $R_i$ generated in step 412 and the authentication key K obtained by decrypting the message LECM2 in step 409.

If $H'_i$ is different from the number $H_i$ received from the device M, then the method is stopped. A message is for example displayed for the attention of the user to warn him that content cannot be viewed (or listened to).

If on the other hand $H'_i=H_i$ then the device M is authenticated. In this case, the terminal module 222 uses the masking key R received to retrieve the control word CW from MCW by performing (step 417) the operation:

$$MCW \oplus R = CW \oplus R \oplus R = CW.$$

The decrypted control word CW can next be transmitted to the "LECM unit" module 223 which is then able to descramble the data of the packet received in step 408 with the control word CW (step 418) so that they may be presented to the user.

Steps 409, 410, 417 and 418 are repeated for each data packet forming the content transmitted from the device M to the presentation device 202. Then, in the next step 419, the presentation device 202 erases from its memory the masking key R and the authentication key K that it had stored temporarily to perform the above calculations.

Once all the data packets forming the content have been transferred from the device M to the presentation device 202, the masking key R and the authentication key K are immediately erased, in step 420, from the memory of the device M so that it is no longer possible to transmit these data again to a presentation device of domain N2 for a possible playback of the content. Consequently, even if the user has recorded the data packets broadcast on the network in step 408, he will not be able to play them back since the keys R and K will have been erased from the memories of the device M and of the presentation device 202.

Figure 5:
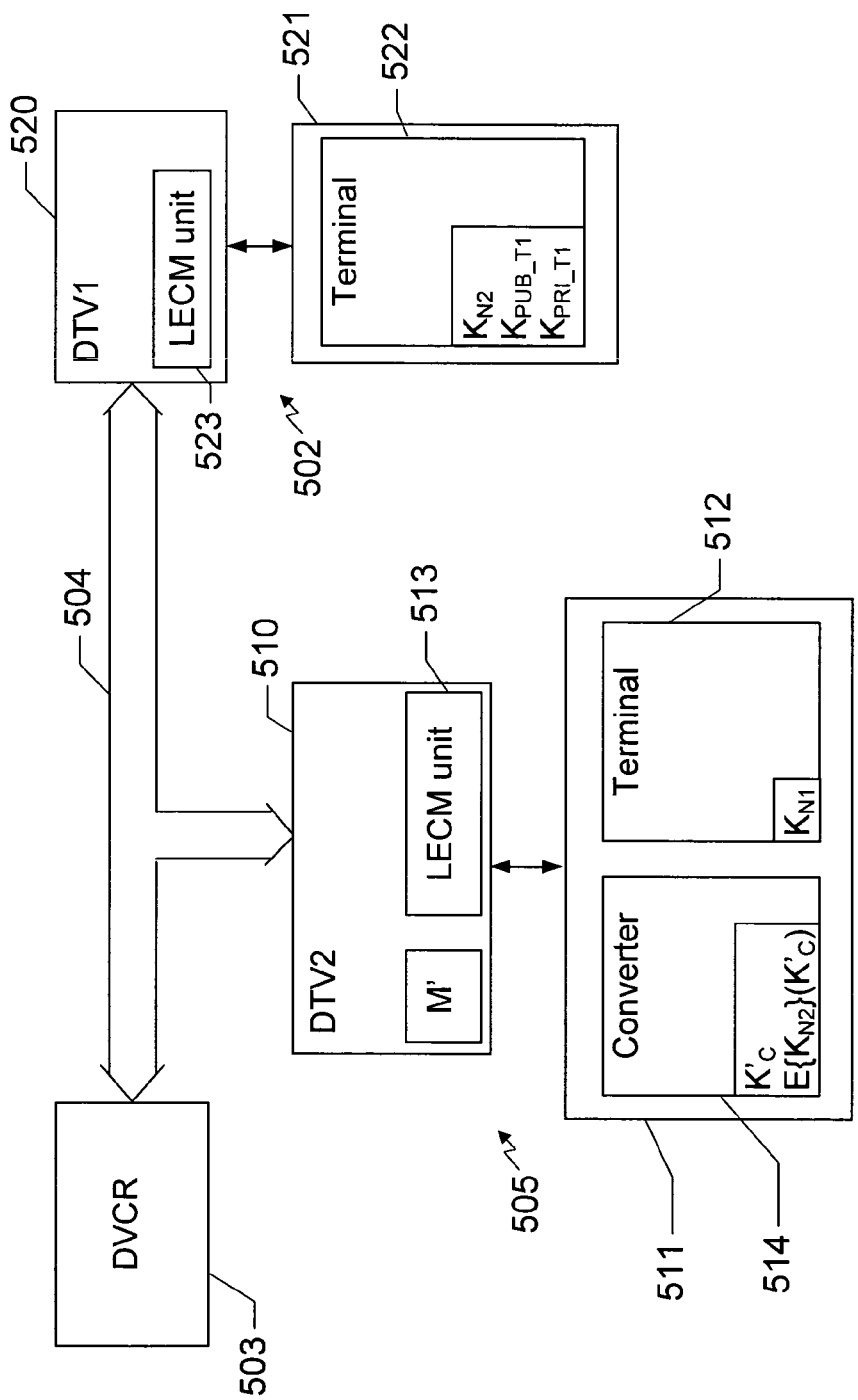
FIGS. 5 and 6 are block diagrams of domestic networks illustrating a second and a third embodiment of the invention.

FIG. 5 illustrates a second embodiment of the invention enabling a content recorded as "private copy" in a domain N1 to be converted into a content of "read only" type for a domain N2.

In FIG. 5, we have diagrammatically represented the digital domestic network of a domain N2 comprising a digital bus 504 to which are connected a digital video cassette recorder 503, a first presentation device 502 and a second presentation device 505.

The first presentation device 502 comprises a television receiver DTV1 520 comprising an "LECM unit" module 523 and a smart card 521 comprising a terminal module 522.

In this embodiment, the device M carrying out the conversion of the content for the domain N2 is implemented by a smart card 511, comprising a terminal module 512 and a converter module 514 (in what follows we shall call it the "terminal/converter" card) which is inserted, into the second presentation device 505, in place of a smart card containing the terminal module of the presentation device 505 which is normally located therein (that is to say there is no need to read on the domain N2 a content recorded in the domain N1). The presentation device 505 also comprises a digital television receiver DTV2 510 which contains a "LECM unit" module 513 as well as an additional module that we shall call M' which is capable of inserting LECM messages into data packets and of broadcasting data packets over the network. These functions are in fact not conventionally implemented in a presentation device.

The manner of operation of this embodiment is similar to that which was described in conjunction with FIGS. 2 to 4.

Firstly, the terminal/converter card 511 must be initialized in domain N1 to receive the secret key $K_{N1}$. It is for example inserted in place of a card containing a conventional terminal module (subsequently called the "terminal card") of a presentation device in the guise of a "virgin" terminal module, receives the key $K_{N1}$ from the "originator" terminal module of the network of domain N1, and then becomes "sterile".

The terminal/converter card 511 can thereafter be connected up to the domain N2 by being inserted in place of the terminal card in a particular presentation device 505 comprising an aforesaid module M'. Provision may be made for the user to indicate, by way of the user interface of the television receiver 510, that this is a special card so as not to generate a situation of lockout of the presentation device 505 since it no longer possesses the secret key of the domain $K_{N2}$ (contained in the terminal card which is normally inserted into the television receiver 510).

Next, the converter module 514 generates a symmetric key $K'_C$ and it has it encrypted by a presentation device of the domain N2, for example by the device 502, to obtain $E\{K_{N2}\}(K'_C)$, by implementing the same steps as those illustrated in FIG. 3.

The content recorded on domain N1 can then be broadcast from the digital video cassette recorder 503 to the presentation device 505 and the method subsequently runs in the same way as the method illustrated in FIG. 4, the presentation device 505 replacing the device M and the presentation device 502 replacing the presentation device 202.

Figure 6:
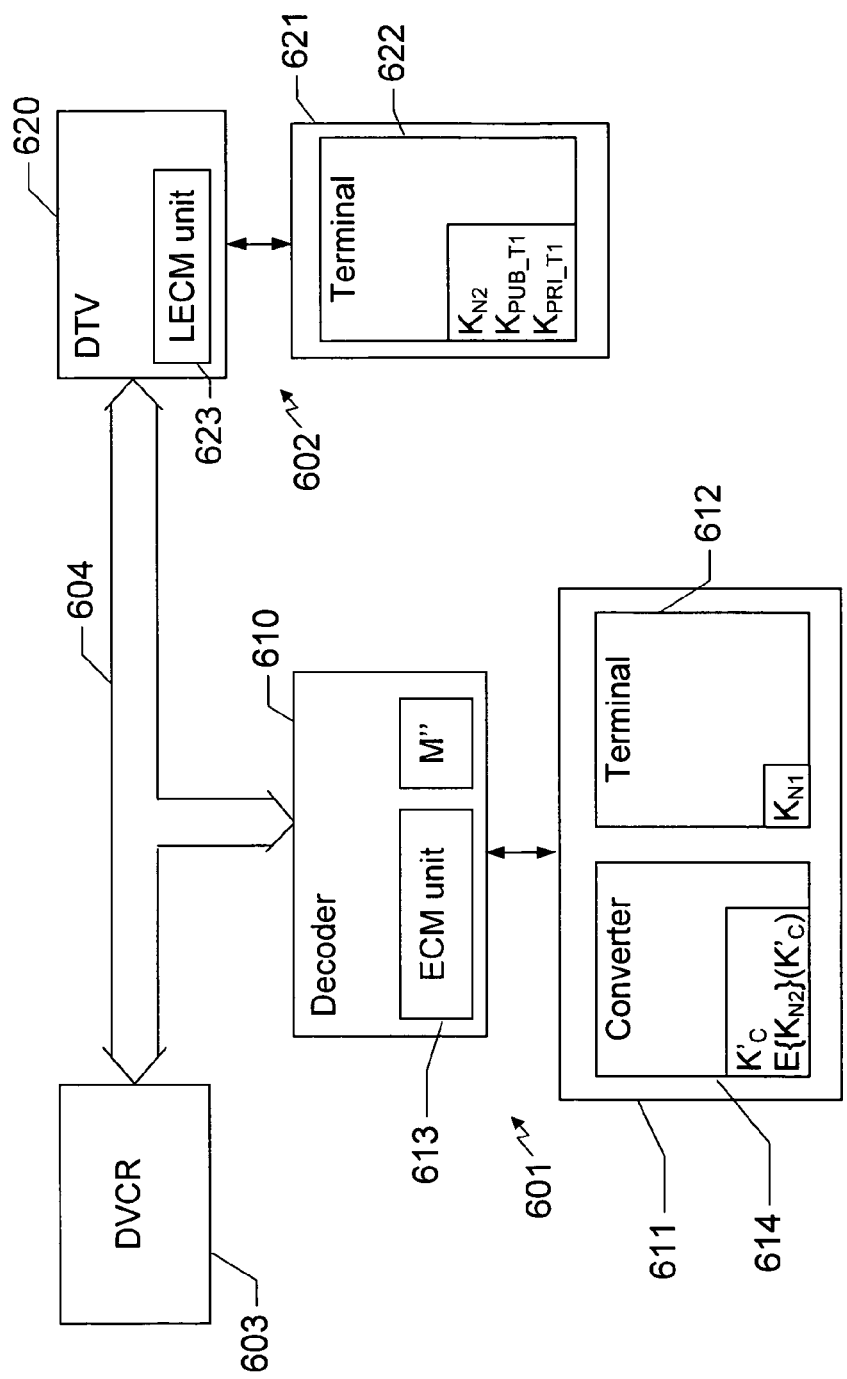

FIG. 6 illustrates a third embodiment of the invention enabling a content recorded as "private copy" in a domain N1 to be converted into a content of "read only" type for a domain N2.

In FIG. 6, we have diagrammatically represented the digital domestic network of a domain N2 comprising a digital bus 604 to which are connected a digital video cassette recorder 603, a source device 601 and a presentation device 602.

The presentation device 602 comprises a television receiver DTV 620 comprising an "LECM unit" module 623 and a smart card 621 comprising a terminal module 622.

In this embodiment, the device M carrying out the conversion of the content for the domain N2 is implemented by a smart card 611, comprising a terminal module 612 and a converter module 614 (that we shall also call a "terminal/converter" card in what follows) which is inserted, into the source device 601, in place of a smart card containing the converter module of the source device which is normally located therein. The source device 601 also comprises a digital decoder 610 which contains an "ECM unit" module 613 as well as an additional module that we shall call M'' which is capable of extracting LECM messages from the data packets received. This function is not in fact implemented conventionally in a source device.

The manner of operation of this embodiment is similar to that of the two embodiments described previously.

Firstly, the terminal/converter card 611 must be initialized in domain N1 to receiver the secret key $K_{N1}$. This is performed in the same way as in the second embodiment described above.

The terminal/converter card 611 can thereafter be connected to the domain N2 by being inserted in place of the converter card into a particular source device 601 comprising an aforesaid module M''. This card is recognized by the source device as a "special" converter card since it possesses a terminal module 612 instead of a conditional access module (such as the module CA 14 of FIG. 1) or a digital rights management module (DRM module). However, its manner of operation is entirely similar to that of a conventional converter card.

The converter module 614 generates a symmetric key $K'_C$, and it has it encrypted by a presentation device of domain N2, for example by the device 602, to obtain $E\{K_{N2}\}(K'_C)$, by implementing the same steps as those illustrated in FIG. 3.

The content recorded on the domain N1 is thereafter broadcast from the digital video cassette recorder 603 to the source device 601. The messages LECM1 are extracted from the data packets received by the module M'' before being transmitted to the terminal module 612, which decrypts the control words CW so as to transmit them to the converter module 614.

The method subsequently runs in the same manner as the method illustrated in FIG. 4 (steps 404 to 420), the source device 601 replacing the device M of FIG. 4 and the presentation device 602 replacing the presentation device 202 of FIG. 4.

The invention is not limited to the exemplary embodiments that have just been described. In particular, it applies equally to digital domestic networks in which the data (particularly the LECM messages) are protected with the aid of a pair of asymmetric keys specific to the domain to which the network belongs, the public key of the network being contained in the source devices in order to encrypt the data and the private key being contained in the presentation devices in order to decrypt the data. In this case, the device M or the terminal/converter card must contain, after the initialization phase, the private key of the first domain and the public key of the second domain so as to be able to transform the data encrypted for the first domain into data that can be decrypted by a presentation device of the second domain.

The invention claimed is:

1. Data processing device connected to a network belonging to a second domain so as to receive data encrypted according to an encryption method specific to a first domain, comprising:
a memory for containing a first secret specific to the first domain;
a conditional access module that decrypts data encrypted according to an encryption method specific to the first domain and such encrypted data is received from a further device in the network belonging to the second domain, the second domain using a different encryption method than that of the first domain, and the conditional access module performs the decryption operation with the aid of first secret to obtain said decrypted data;
a converter module that encrypts said data decrypted according to an encryption method specific to the second domain, so that the data encrypted by said converter module cannot be decrypted other than with the aid of a second secret specific to the second domain a memory for containing a first symmetric key as well as the encryption of said first symmetric key with the aid of the second secret specific to said second domain;

said converter module converts the data decrypted with the aid of the first symmetric key;

an interface that communicates:
the data encrypted from said converter module; and
the encryption of said first symmetric key with the aid of the second secret specific to the second domain.

2. Device according to claim 1, wherein the data received by said device contains copy control information of at least one of the "private copy authorized" or "single copy only authorized" type,
wherein the device replaces said copy control information with other copy control information of the "read only" type;
and wherein a data broadcast by said device contain said copy control information of the "read only" type.

3. Method of processing data, encrypted according to a method of encryption using a first secret specific to a first domain, in a network belonging to a second domain, comprising:
(a) receiving the data encrypted in the network from a further device in a network associated with the second domain;
(b) decrypting said data encrypted with the aid of the first secret contained in the processing device so as to obtain decrypted data;
(c) encrypting the data decrypted with the aid of a first symmetric key contained in the processing device; and
(d) performing a data broadcast in the network:
of the data encrypted in step (c) with the aid of the first symmetric key; and
of the encryption of said first symmetric key with the aid of a second secret specific to the second domain, said encryption having been transmitted previously to the processing device by a device of the second domain.

4. Method according to claim 3, step (c) comprising the substeps for the processing device:
generating and storing an ephemeral masking key;
masking the data decrypted with the aid of said masking key so as to form masked data; and
encrypting said data masked with the aid of the first symmetric key.

5. Method according to claim 4, step (c) further comprising the substeps for the processing device:
generating and storing an ephemeral authentication key; and
encrypting said ephemeral authentication key and the data masked with the aid of the first symmetric key;
and wherein the method furthermore comprises, after step (d), a step consisting in:
(f) responding to an operation of authentication by a presentation device connected to the network which has previously received the data broadcast in step (d), the response to the authentication operation comprising said ephemeral masking key.

6. Method according to claim 5, wherein the response to the authentication operation is calculated as a function of said authentication key and of a random number received from said presentation device.

7. Method according to claim 3, wherein the encrypted data received in step (a) contain copy control information of at least one of the "private copy authorized" and "single copy only authorized" type; and wherein the method furthermore comprises, before step (d), a step of replacing said copy control information with other copy control information of the "read only" type.

8. Method according to claim 3, further comprising a phase of initializing the processing device comprising:
connecting said processing device to the network belonging to the first domain; and
receiving in said processing device the secret specific to the first domain, said secret being transmitted by another device connected to the network of the first domain.

9. Method according to claim 8, wherein the initializing phase furthermore comprises:
connecting said processing device to the network belonging to the second domain; and comprising the steps for said processing device, of:
generating the first symmetric key;
transmitting said first symmetric key in a secure manner to at least one device of the second domain; and
receiving from a device of the second domain the encryption of said first symmetric key with the aid of the second secret specific to the second domain.

10. A method performed by a data processing device connected to a network belonging to a second domain so as to receive data encrypted according to an encryption method specific to a first domain, comprising:
storing in a memory a first secret specific to the first domain;
decrypting data encrypted according to an encryption method specific to the first domain and such encrypted data is received from a further device in the network belonging to the second domain, the second domain using a different encryption method than that of the first domain, and the conditional access module performs the decryption operation with the aid of first secret to obtain said decrypted data;
encrypting said data decrypted according to an encryption method specific to the second domain, so that the data encrypted by said converter module cannot be decrypted other than with the aid of a second secret specific to the second domain
storing in said memory a first symmetric key as well as the encryption of said first symmetric key with the aid of the second secret specific to said second domain;
converting the data decrypted with the aid of the first symmetric key;
communicating the data encrypted from said converter module; and
communicating the encryption of said first symmetric key with the aid of the second secret specific to the second domain.

11. A method according to claim 10, wherein the data received by said device contains copy control information of at least one of the "private copy authorized" or "single copy only authorized" type,
wherein the device replaces said copy control information with other copy control information of the "read only" type;
and wherein a data broadcast by said device contain said copy control information of the "read only" type.

12. A data processing device that processes data, encrypted according to an encryption operation using a first secret specific to a first domain, in a network belonging to a second domain, comprising:
a processor;
a memory storing instructions, when executed by said processor perform the operations:

(a) receiving the data encrypted in the network from a further device in a network associated with the second domain;
(b) decrypting said data encrypted with the aid of the first secret contained in the processing device so as to obtain decrypted data;
(c) encrypting the data decrypted with the aid of a first symmetric key contained in the processing device; and
(d) performing the data broadcast in the network:
- of the data encrypted in operation (c) with the aid of the first symmetric key; and
- of the encryption of said first symmetric key with the aid of a second secret specific to the second domain, said encryption having been transmitted previously to the processing device by a device of the second domain.

13. The apparatus according to claim 12, where the operation of operation (c) further comprising the sub-operations performed by the processor when executing instructions perform the operations:
- generating and storing an ephemeral masking key;
- masking the data decrypted with the aid of said masking key so as to form masked data; and
- encrypting said data masked with the aid of the first symmetric key.

14. Apparatus according to claim 13, where the operation (c) further comprising the sub-operations performed by the processor when executing instructions perform:
- generating and storing an ephemeral authentication key; and
- encrypting said ephemeral authentication key and the data masked with the aid of the first symmetric key;
- and wherein the operations performed by the processor furthermore comprises, after operation (d), an operation consisting:
(f) responding to an operation of authentication by a presentation device connected to the network which has previously received the data broadcast in operation (d), the response to the authentication operation comprising said ephemeral masking key.

15. Apparatus according to claim 14, wherein the response to the authentication operation is calculated as a function of said authentication key and of a random number received from said presentation device.

16. Apparatus according to claim 12, wherein the encrypted data received in operation (a) contains copy control information of at least one of the "private copy authorized" and "single copy only authorized" type; and
wherein the operations performed by the processor furthermore comprises, before operation (d), an operation of replacing said copy control information with other copy control information of the "read only" type.

17. Apparatus according to claim 12, further comprising a phase of initializing the processing device with the operations:
- connecting said processing device to the network belonging to the first domain; and
- receiving in said processing device the secret specific to the first domain, said secret being transmitted by another device connected to the network of the first domain.

18. Apparatus according to claim 17, wherein the initializing phase furthermore comprises the operations:
- connecting said processing device to the network belonging to the second domain; and comprising the operations for said processing device:
- generating the first symmetric key;
- transmitting said first symmetric key in a secure manner to at least one device of the second domain; and
- receiving from a device of the second domain the encryption of said first symmetric key with the aid of the second secret specific to the second domain.

* * * * *